(12) United States Patent
Schwartz et al.

(10) Patent No.: US 10,970,516 B2
(45) Date of Patent: Apr. 6, 2021

(54) SYSTEMS AND METHODS FOR BIOMETRIC RECOGNITION

(71) Applicant: Synaptics Incorporated, San Jose, CA (US)

(72) Inventors: Adam L. Schwartz, San Jose, CA (US); Vladan Petrovic, San Jose, CA (US)

(73) Assignee: Synaptics Incorporated, San Jose (GA)

(*) Notice: Subject to any disclaimer, the term of this patent is extended or adjusted under 35 U.S.C. 154(b) by 92 days.

(21) Appl. No.: 16/169,818

(22) Filed: Oct. 24, 2018

(65) Prior Publication Data

US 2019/0122024 A1 Apr. 25, 2019

Related U.S. Application Data

(60) Provisional application No. 62/577,115, filed on Oct. 25, 2017.

(51) Int. Cl.
*G06K 9/00* (2006.01)
*G06F 16/23* (2019.01)
*G06K 9/62* (2006.01)

(52) U.S. Cl.
CPC ..... *G06K 9/00087* (2013.01); *G06F 16/2358* (2019.01); *G06F 16/2365* (2019.01); *G06K 9/001* (2013.01); *G06K 9/00067* (2013.01); *G06K 9/00926* (2013.01); *G06K 9/6202* (2013.01)

(58) Field of Classification Search
CPC .......... G06K 9/00087; G06K 9/00926; G06K 9/001; G06K 9/6202; G06K 9/00067; G06F 16/2358; G06F 16/2365
See application file for complete search history.

(56) References Cited

U.S. PATENT DOCUMENTS

| | | | |
|---|---|---|---|
| 5,633,947 A | 5/1997 | Sibbald | |
| 10,496,804 B2* | 12/2019 | Pang | G06F 21/32 |
| 2006/0294393 A1* | 12/2006 | McCall | H04L 9/32 |
| | | | 713/186 |
| 2007/0274575 A1 | 11/2007 | Russo | |
| 2016/0026840 A1* | 1/2016 | Li | G06K 9/00013 |
| | | | 348/77 |
| 2016/0283703 A1* | 9/2016 | Allyn | G06F 21/32 |
| 2017/0228581 A1* | 8/2017 | Uno | G06K 9/0008 |
| 2017/0330020 A1* | 11/2017 | Tuneld | G06K 9/00087 |
| 2019/0012447 A1* | 1/2019 | Lesso | G10K 11/17823 |
| 2019/0080066 A1* | 3/2019 | Van Os | H04N 5/23222 |

* cited by examiner

*Primary Examiner* — Christopher M Brandt
(74) *Attorney, Agent, or Firm* — Leydig, Voit & Mayer, Ltd.

(57) ABSTRACT

Disclosed are systems and methods that include a device for updating biometric data in an enrollment data set. The device includes a biometric sensor and a processor. The processor is configured to reject an authentication attempt based on a biometric input from the biometric sensor failing a first match determination, accept an additional authentication attempt based on an additional biometric input from the biometric sensor passing an auxiliary match determination, and update a biometric data repository based on the biometric input passing an auxiliary match determination.

20 Claims, 8 Drawing Sheets

SYSTEMS AND METHODS FOR BIOMETRIC RECOGNITION

CROSS-REFERENCE TO RELATED APPLICATIONS

This patent application claims the benefit of U.S. Provisional Patent Application No. 62/577,115, filed on Oct. 25, 2017, which is incorporated by reference.

TECHNICAL FIELD

Embodiments disclosed herein relate to systems and methods for electronic biometric recognition.

BACKGROUND

Biometric recognition is a popular tool for a wide range of environments and is often used to enhance the security and usability of electronic systems. Biometric recognition systems can be used to automatically recognize distinctive personal characteristics (or traits) of individuals for purposes such as secure access control and personalization of device settings based on identity, among other possibilities. Typically, biometric recognition involves detection of a biometric for comparison to reference biometric data (or enrollment data). Unfortunately, biometric recognition systems can be highly sensitive to changes that cause the detected biometrics to be unrecognizable. This in turn decreases the accuracy and reliability of the biometric recognition system.

BRIEF SUMMARY OF THE DISCLOSURE

One embodiment provides a device for updating biometric data. The device includes a biometric sensor and a processor. The processor is configured to: reject an authentication attempt based on a biometric input from the biometric sensor failing a match determination, accept an additional authentication attempt based on an additional biometric input from the biometric sensor passing an auxiliary match determination, and update a biometric data repository based on the biometric input.

Another embodiment includes a method of updating biometric data. The method includes rejecting an authentication attempt based on a biometric input from a biometric sensor failing a match determination, accepting an additional authentication attempt based on an additional biometric input from the biometric sensor passing an auxiliary match determination, and updating a biometric data repository based on the biometric input.

Yet another embodiment includes a non-transitory computer readable storage medium. The non-transitory computer readable storage medium storing instructions that, when executed by a processor, configure the processor to reject an authentication attempt based on a biometric input from the biometric sensor failing a match determination, accept an additional authentication attempt based on an additional biometric input from the biometric sensor passing an auxiliary match determination, and update a biometric data repository based on the biometric input.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, summary, brief description of the drawings, the following detailed description, or the appended abstract.

Figure 1:
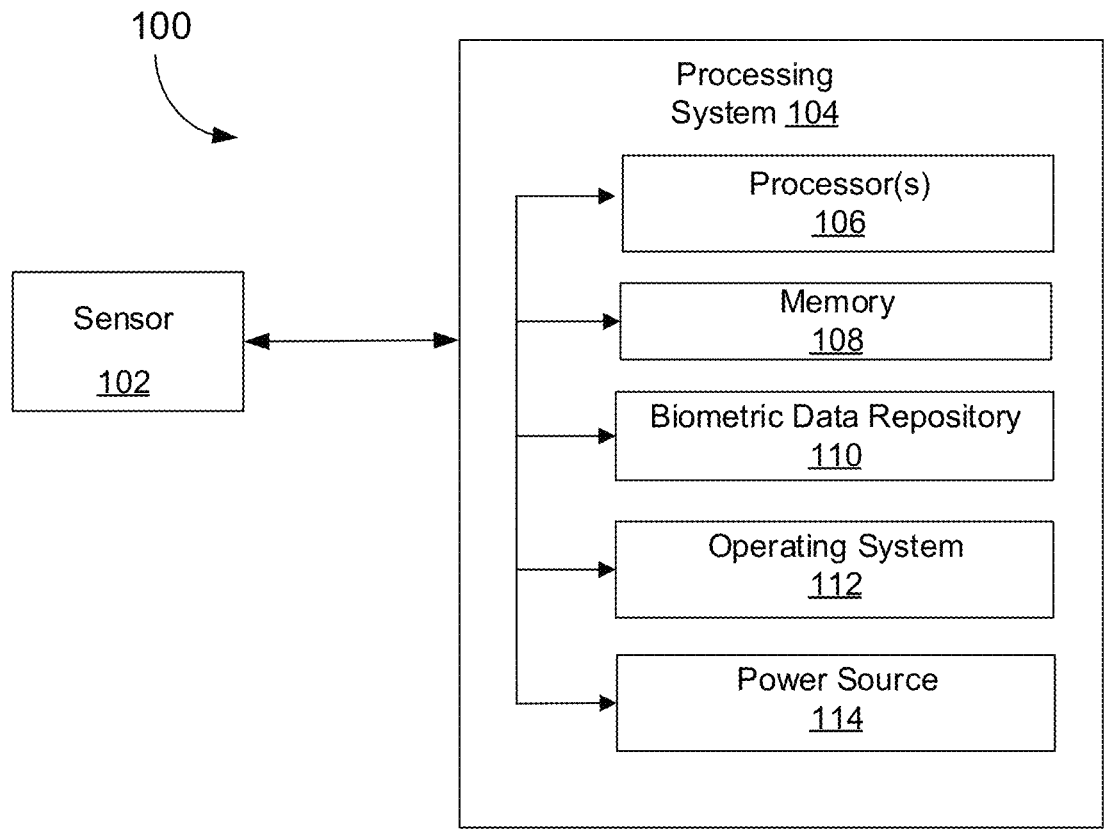
FIG. 1 is a block diagram depicting an embodiment of an electronic device.

Turning to the figures, FIG. 1 is a block diagram of an electronic device 100 (or electronic system), in accordance with some embodiments. Some non-limiting examples of electronic devices 100 include personal computers of all sizes and shapes, such as desktop computers, laptop computers, netbook computers, tablets, web browsers, e-book readers, and personal digital assistants (PDAs). Additional example electronic devices 100 include composite input devices, such as physical keyboards and separate joysticks or key switches. Further example electronic devices 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

The electronic device 100 includes a sensor 102 and a processing system 104. By way of example, basic functional components of the electronic device 100 that may be utilized during a biometric match attempt or authentication attempt are illustrated. The processing system 104 includes a processor(s) 106, a memory 108, a biometric data repository 110, an operating system (OS) 112, and a power source(s) 114. Each of the processor(s) 106, the memory 108, the biometric data repository 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 to recognize a biometric or determine whether an authentication attempt is accepted or rejected. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

The biometric data repository 110 can be stored on one or more non-transitory computer-readable storage media and/or the memory 108. The biometric data repository 110 can include enrollment data (or reference data) for one or more enrolled biometrics (or reference biometrics). The enrollment data may be obtained from biometric images (e.g., the images themselves, compressed images, extracted feature sets, numerical representations of the images, etc.), one or multiple biometric objects (e.g., fingers, irises, palm prints), and full or portions of the biometric object(s). In some embodiments, the biometric data repository 110 includes a plurality of templates that can be associated with appropriate identifiers. For example, the plurality of templates can correspond to multiple users, multiple biometric objects, multiple enrollment views of the same biometric object, and/or other enrollment information. More generally, the biometric data repository 110 may be configured to store information about biometrics. The biometric data repository 110 may further be configured for long-term storage of information. In some embodiments, the biometric data repository 110 is stored on non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others. Although the biometric data repository 110 is shown as included in the processing system 104, in some embodiments, the biometric data repository 110 or portions thereof may be stored remotely from the processing system 104 and/or the sensor 104.

The processing system 104 can also host an operating system (OS) 112. The operating system 112 may control operations of the components of the processing system 104. For example, the operating system 112 may facilitate the interaction of the processor(s) 106, memory 108, and biometric data repository 110. The processing system 104, although shown as including a processor 106 and memory 108, may further include a microprocessor, microcontroller and/or dedicated circuitry. In some embodiments, the processing system 104 sends a message to the sensor 102 to instruct the sensor 102 to capture an image of an object (e.g., such as for an authentication attempt). Further, in some embodiments when the device 100 is in a sleep mode, the sensor 102 may send an interrupt signal to the processing system 104 when the sensor detects a press on sensor 102, which causes the electronic device 100 to wake from the sleep mode. In addition, the processing system 104 may be configured to output prompts or feedback to a user through a user interface (e.g., an electronic display, speaker, haptic device, and the like).

The processor(s) 106 may implement hardware and/or software to obtain data describing an image of an input object or describing a biometric. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification. The processor(s) 106 may also perform image processing operations such as contrast enhancement, scaling, background subtraction, and the like. In some embodiments, the processor(s) 106 comprise one or more dedicated processors associated with the sensor 102. Additionally or alternatively, the processor(s) 106 may comprise one or more host processors associated with the electronic device 100.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Sensor 102 can be configured to detect biometrics and/or other inputs by interacting with one or more users. The interaction can be active or passive and can be direct or indirect. By way of example, in some embodiments the sensor 102 and/or one or more input devices such as keyboards, touch screens, and the like can be configured to capture inputs for authentication, such as biometrics inputs and passcodes (e.g., passwords, PIN codes, authentication gestures, etc.) and the like.

Sensor 102 can be implemented as a physical part of the processing system 104 or can be physically separate from the processing system 104. As appropriate, the sensor 102 may communicate with parts of the electronic device 100 using any one or more of the following: buses, networks, and other wired or wireless interconnections. In some embodiments, sensor 102 is implemented as a fingerprint sensor to capture a fingerprint image of a user. In other embodiments, the sensor 102 is implemented as a camera that can be used to capture facial or ocular biometrics. In yet further embodiments, the sensor is implemented as a microphone for capturing voice biometrics. The sensor device 102 can be incorporated as part of a display, for example, or may be a discrete sensor. In some embodiments, the sensor 102 may be configured for image sensing (e.g., using optical imaging, capacitive imaging, acoustic imaging, etc.).

The sensor 102 may utilize any suitable combination of sensor components and sensing technologies to detect user input in a sensing region. Some implementations utilize arrays or other regular or irregular patterns of multiple sensing elements to detect the input. Example sensing techniques that the sensor 102 may use include capacitive sensing techniques, optical sensing techniques, resistive sensing techniques, thermal sensing techniques, inductive sensing techniques, magnetic sensing techniques, and/or radar sensing techniques.

In one example, the sensor 102 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the sensor 102 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can sometimes be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across this interface at the region of contact by the input object. An example of this is presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the sensor 102 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and/or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or elements that both transmit and receive may be used (e.g., ultrasonic transceivers). In one implementation, an acoustic pulse is emitted and reflected at the interface corresponding to the input surface. The acoustic impedance at the interface differs depending on whether a ridge or valley of the finger is in contact with that portion of the input surface, affecting the intensity of the detected waves reflected back from the input surface. In some embodiments, emitted ultrasonic waves are able to penetrate sub-surfaces of the input object, such as dermal layers of a human finger.

In another example, the sensor 102 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One example technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another example technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

Some embodiments of electronic devices such as the electronic device 100 shown in FIG. 1 can be configured for detecting and recognizing biometrics. In general, biometrics include personal physiological or behavioral characteristics (or traits) that are distinctive and informative of a user's identity. Examples of biometrics include fingerprints, faces, hand or palm prints, ocular traits (e.g., iris, eye vein, retina, etc.), vascular traits (e.g., finger vein, eye vein, wrist vein, etc.), voices, and behavioral biometrics such as keystroke patterns.

Figure 2:
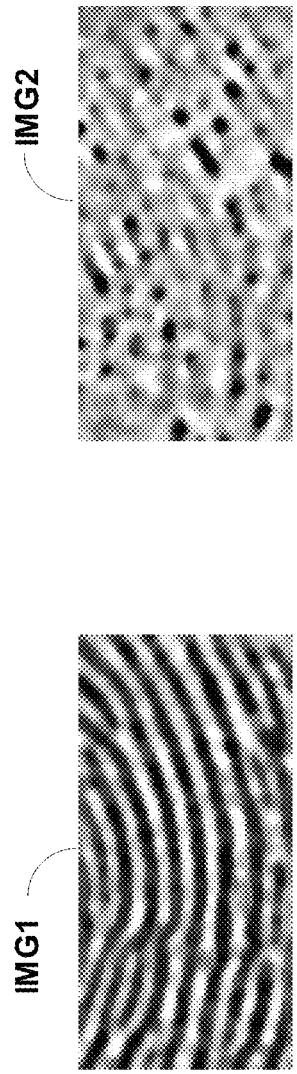
FIG. 2 is a pair of images depicting an embodiment of a changing biometric.

Recognition of physiological biometrics, such as fingerprints and faces, is often based on capturing images of the biometric with a sensor (e.g., using optical, capacitive, acoustic, or other appropriate sensing methods). Referring to FIG. 2, two images of biometrics are depicted. More particularly, FIG. 2 shows two images of fingerprints captured using an optical sensor. The two images in FIG. 2 exemplify how changed conditions can affect detection of biometrics, and more particularly, exemplify how changed finger skin conditions can affect fingerprint images from an optical fingerprint sensor.

The first fingerprint image IMG1 is an image obtained from a finger having a typical amount of moisture in the skin. The second fingerprint image IMG2 is an image obtained from a finger shortly after hand washing. The hand washing changes the condition of skin on the finger and affects the resulting biometric image. More particularly, the hand washing decreases the moisture content of the skin relative to the unwashed or typical condition. When the finger touches an input surface (or platen) of the optical sensor, this changed condition affects the contact regions between the input surface and the finger, which in turn affects the interaction of light at the input surface that is detected by the optical sensor. As can be seen in FIG. 2, this change significantly impacts the appearance of the fingerprint in the resulting images. This in turn degrades the performance of the biometric recognition system and significantly increases a false rejection rate (FRR) of an authentication system employing the optical fingerprint sensor, due to inability of the system to recognize images captured from the changed fingerprint. For example, a user may enroll their fingerprint under typical skin conditions similar to those shown in the first image IMG1. When the same user later provides the same fingerprint in connection with an authentication or match attempt under washed finger conditions similar to those in the second image IMG2, a false match failure determination is likely due to the changed appearance relative to the enrollment images. The same problem can occur if the user enrolls their fingerprint under washed finger conditions and then later provides their same finger under typical (unwashed) conditions.

A similar changing biometric problem can occur with other types of fingerprint sensors as well. For example, fingers that are too dry or too moist can also impact images captured with capacitive and acoustic fingerprint sensors (with varying effect). Further, other changes associated with a biometric detection can degrade performance of fingerprint and other biometric recognition systems. For example, pose and lighting variations at the capture stage can affect the appearance of the biometric in facial recognition and fingerprint recognition systems. Voice recognition performance can degrade due to changes in detected voice signals and template aging. Anytime a biometric recognition system is not robust to changes associated with biometric over different instances of detection and recognition, performance of the system can suffer.

Referring again to FIG. 2, the second fingerprint image IMG2 appears to have low contrast regions with broken up and ill-defined fingerprint ridges and valleys. To the untrained eye it appears to be of insufficient quality for use in a biometric recognition system. However, despite this appearance, the second fingerprint image IMG2 is not necessarily low quality or unusable. Rather, it is rich in biometric information that can be utilized by a biometric recognition system. In some embodiments, recognition performance can be improved by storing an enrollment data set more representative of changes associated with the biometric and/or by employing a matching process that is more robust to changes associated with the biometric.

One way to store a more complete set of biometric data is to model the effect of the changes on the appearance of the biometric, or more generally the effect of the changes on the resulting signals or data obtained from the detected biometric. For example, the mapping from a typical fingerprint exemplified in the first image IMG1 to the washed fingerprint exemplified in the second image IMG2, or vice versa, can be modelled and artificially applied to generate an artificially changed (e.g., artificially washed) representation of the biometric. The artificially changed representation can then be matched with greater accuracy to genuinely changed representations of biometrics that are detected with a biometric sensor. The transformation that maps the enrolled biometric from one condition to another can be modeled or estimated using any suitable technique, such as through the use of machine learning, an ad hoc approach, and/or empirically from observed data. In some embodiments, the transformation can be applied at enrollment time or to enrolled biometrics and the artificially transformed representation can be stored in a biometric data repository. Directly storing the artificial representation of the enrolled biometric can have benefits in terms of reduced match time or reduced latency, compared an approach that attempts to apply an artificial transformation to new verification inputs at match time instead.

Another way to store a more complete set of biometric data is to detect biometrics under a variety of changed conditions and store the data obtained from the detected biometrics under the different conditions. The resulting stored data derived from the changed biometrics can then provide an enrollment data set that is more representative of the biometric under changed conditions for later comparisons to new inputs. Some methods may attempt to store a more representative set of data through the use of explicit user feedback or prompts that request the user to create changed conditions during active enrollment. However, it can be cumbersome, impractical, or unreliable for a user to create or recreate same conditions or circumstances. For example, in the case of a washed finger as exemplified in FIG. 2, it can be cumbersome for a user to enroll using a typical finger, wash the finger, then enroll again using the washed finger.

A template updating scheme that automatically updates the stored biometric data set based on new biometric inputs can work well for this purpose and reduce the burden on the user. A template updating scheme can obtain new biometric inputs in connection with new match attempts or authentication attempts and update the enrollment data set based on the new biometric inputs when certain criteria are met. More generally, a template updating scheme can detect biometrics outside of an active enrollment process or in connection with other usage of a device. Such a template updating scheme can be referred to as passive enrollment. There may be challenges and risks associated with such an approach. For example, an imposter or false user can compromise the security or performance of the system by inputting false biometric data into the enrollment data set. While new biometric inputs that form the basis of successful (passing) matches or accepted authentication attempts can provide less risk of an imposter entering the template, they also provide less new information to the enrollment data set. Since they already sufficiently match the existing template, the information contained in these successful inputs may be somewhat redundant to the existing enrollment data set.

FIGS. 3-6 disclose embodiments for updating biometric data in connection with biometric match failures and/or biometric-based authentication rejections. Data obtained from the match failures may be added to the enrollment data set and/or the match failure may be used as an indicator for new biometric inputs to be captured. Successful (accepted) authentication with additional inputs may be used to increase the confidence that the match failure belongs to the enrolled user(s) (true user) and can be utilized for template updating. Auxiliary matching on the failed biometric input can be introduced in connection with the additional accepted authentication, further increasing confidence that the match failure is derived from the true enrolled user and can form the basis of an implicit template update. Additionally or alternatively, auxiliary match determinations on failed biometric inputs can be performed in cases of multiple templates to identify an appropriate template for update and/or to employ the identification determination for other purposes.

In some embodiments, auxiliary match determination may employ one or more different match parameters, such as one or more different thresholds, different features, different alignment processes, and/or different scoring functions relative to the verification match determination. For example, in some embodiments the auxiliary match determination utilizes the same score as that used for verification, but with a different, relaxed threshold. In some embodiments, the verification match determination and auxiliary match determinations may be based on different scores corresponding to different features. For example, the verification match determination may be based on local features, and the auxiliary match determination may be based on global features. An example of a match determination based on global features would be a match determination based on a computation of Euclidean distance between pixels in a new input image (e.g., verify image) and a stored (e.g., enroll image) at a determined best possible alignment. As another example, a strength of a correlation peak may be used. The auxiliary match determination can also be based on a lower security level and/or more computationally expensive process than the failed verification match determination. Since the auxiliary match determination may be employed in connection with an additional strong authentication (e.g., passcode, alternate biometric, etc.), a weaker auxiliary match may be tolerated based on an overall high security level provide by the combination of weak auxiliary match plus strong alternate authentication. Additionally or alternatively, since auxiliary match determination may be employed in special cases of initial match failures or in the background for validating implicit template updates, a more computationally expensive or slower process may be acceptable without unduly increasing the frustration to the user experience.

Referring again to FIGS. 3-6, flowcharts are depicted in which one or more steps can be implemented, or configured to be implemented, by the electronic device 100, the processor(s) 106, and/or any appropriate device or processing circuitry. In some embodiments, the processor(s) 106 or other processing circuitry can be configured to implement one or more of the steps using specially programmed general purpose hardware (e.g., a CPU configured via one or more programs stored in memory to execute steps of a method) and/or special purpose hardware (e.g., dedicated digital logic circuit blocks). Although the methods are illustrated in the flowcharts as flowing in a particular order, it will be appreciated that certain steps can be performed in any appropriate order or sequence unless stated otherwise or clearly contradicted by context or the logic of the method. Further, it will be appreciated that various steps can be performed serially or in parallel unless stated others or clearly contradicted by context or the logic of the method. As well, several intervening steps that can optionally be included in the various flowcharts have been omitted for simplicity.

Figure 3:
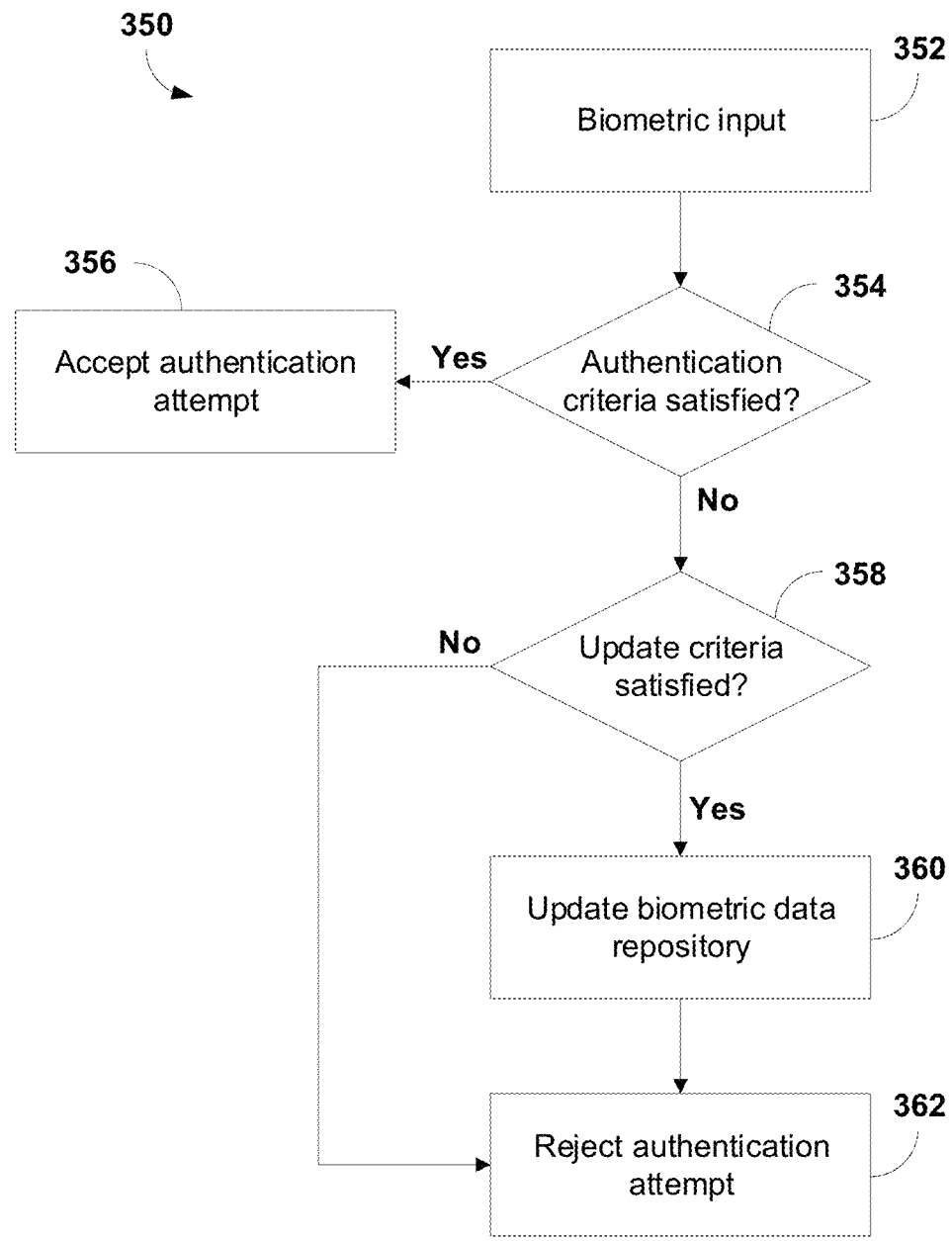
FIG. 3 is a flowchart depicting an embodiment of a method of updating biometric data.

Turning to FIG. 3, a method 350 of updating biometric data is depicted. In particular, the method 350 depicted in FIG. 3 involves updating a biometric data repository in connection with a biometric authentication rejection (or failed authentication attempt).

At step 352, the method includes obtaining a biometric input in connection with an authentication attempt. At step 354, an authentication determination is made based on the biometric input from step 352 and one or more authentication criteria. When the authentication criteria are determined to be satisfied, the authentication attempt is accepted at step 356. When the authentication criteria are determined not to be satisfied (or when the authentication attempt is rejected), an update determination is made at step 358 based on whether one or more update criteria are satisfied. When the update criteria are determined to be satisfied, a biometric data repository is updated at step 360. When the update criteria are determined not to be satisfied, then the authentication attempt is rejected at step 362 without updating the biometric data repository.

The biometric input at step 352 may be obtained from a biometric sensor (or input device) directly or indirectly and corresponds to a biometric (e.g., fingerprint, face, voice, etc.) that is detected by the biometric sensor in connection with the authentication attempt. The biometric input may include signals or data (e.g., images, audio signals, etc.) that correspond to the detected biometric and can be analyzed and further processed to make one or more determinations regarding the biometric input. In some embodiments disclosed herein, each authentication attempt may be implicit or explicit, as appropriate. For example, the biometric input at step 352 may be obtained explicitly in response to a user request for authentication and/or in connection with output of a prompt for a user to provide a biometric. Alternatively, the biometric input at step 352 may be obtained implicitly without providing an indication to a user, such as in connection with a persistent or continuous authentication attempt. Further, the acceptance of the authentication attempt at step 356 and/or the rejection of the authentication attempt at step 362 may be performed passively without providing an indication to a user.

The authentication criteria at step 354 may include one or more biometric match criteria, and the authentication determination may be based, in whole or in part, on the biometric input from step 352 matching or failing to match one or more biometric match criteria. An example of authentication criteria includes determination of a match score based on a comparison between the biometric input received at step 352 against the data in the biometric data repository, where the match score may be associated with a multi-modal or multi-factor authentication attempt.

The match determination may involve comparing the biometric input to stored biometric data (or reference data) from a biometric data repository. The stored biometric data may include enrollment data corresponding to one or more enrolled biometrics that may have been previously detected by the same biometric sensor used to capture the biometric input from step 352 and/or may have been otherwise obtained (e.g., from a different sensor or database). When the biometric input is determined to match the enrollment data with sufficiently high confidence, the biometric input passes the match determination and the authentication attempt may be accepted at step 356. When the biometric input is determined to not match the enrollment data with sufficiently high confidence, the biometric input fails the match determination and the authentication attempt may be rejected at step 362.

At step 360, the biometric data repository may be updated with data from the biometric input from step 352 and/or with data from one or more newly obtained biometric inputs. In some embodiments, the biometric data repository is updated by storing data from the biometric input that fails the match determination. Additionally or alternatively, a biometric sensor may be scanned or operated to obtain one or more additional biometric inputs when the update criteria at step 358 are satisfied, and the additional input(s) can be used for updating the templates. The update criteria at step 358 may include any appropriate criteria, and in some embodiments, the update criteria include one or more of the update criteria depicted in the embodiment shown in FIGS. 4A-4B, as further described below, such as the auxiliary match determination and/or additional authentication based on additional input.

Also, it should be noted that biometric data updating can optionally be used separately in connection with the authentication acceptance at step 356 (e.g., based on other update criteria or conditions). For instance, in some embodiments, data in the biometric data repository may be updated with biometric input data collected at step 352 when that data satisfies the authentication criteria at step 354.

Figure 4A:
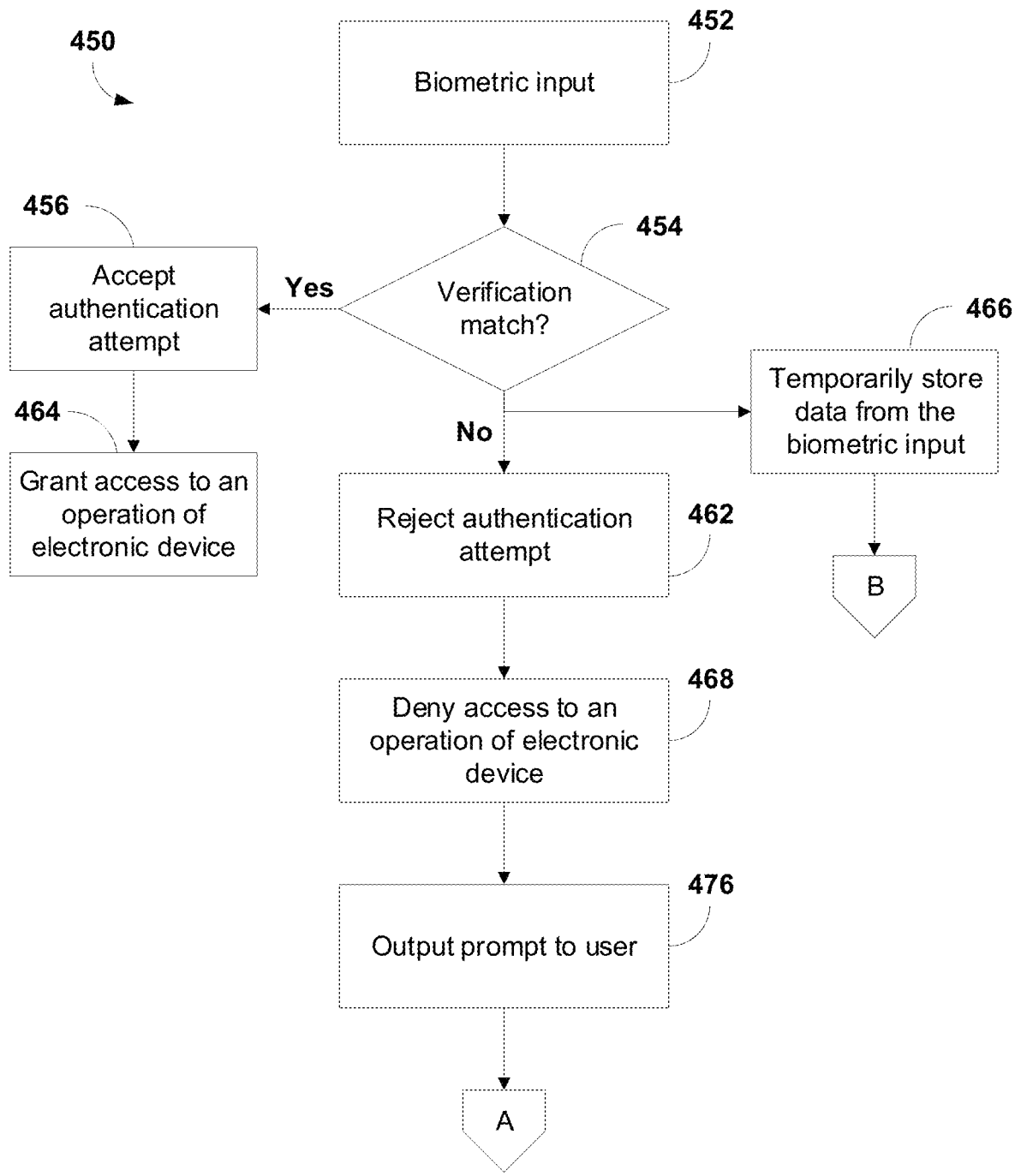
FIGS. 4A-4B is a flowchart depicting an embodiment of a method of updating biometric data based on a plurality of update criteria.
Figure 4B:
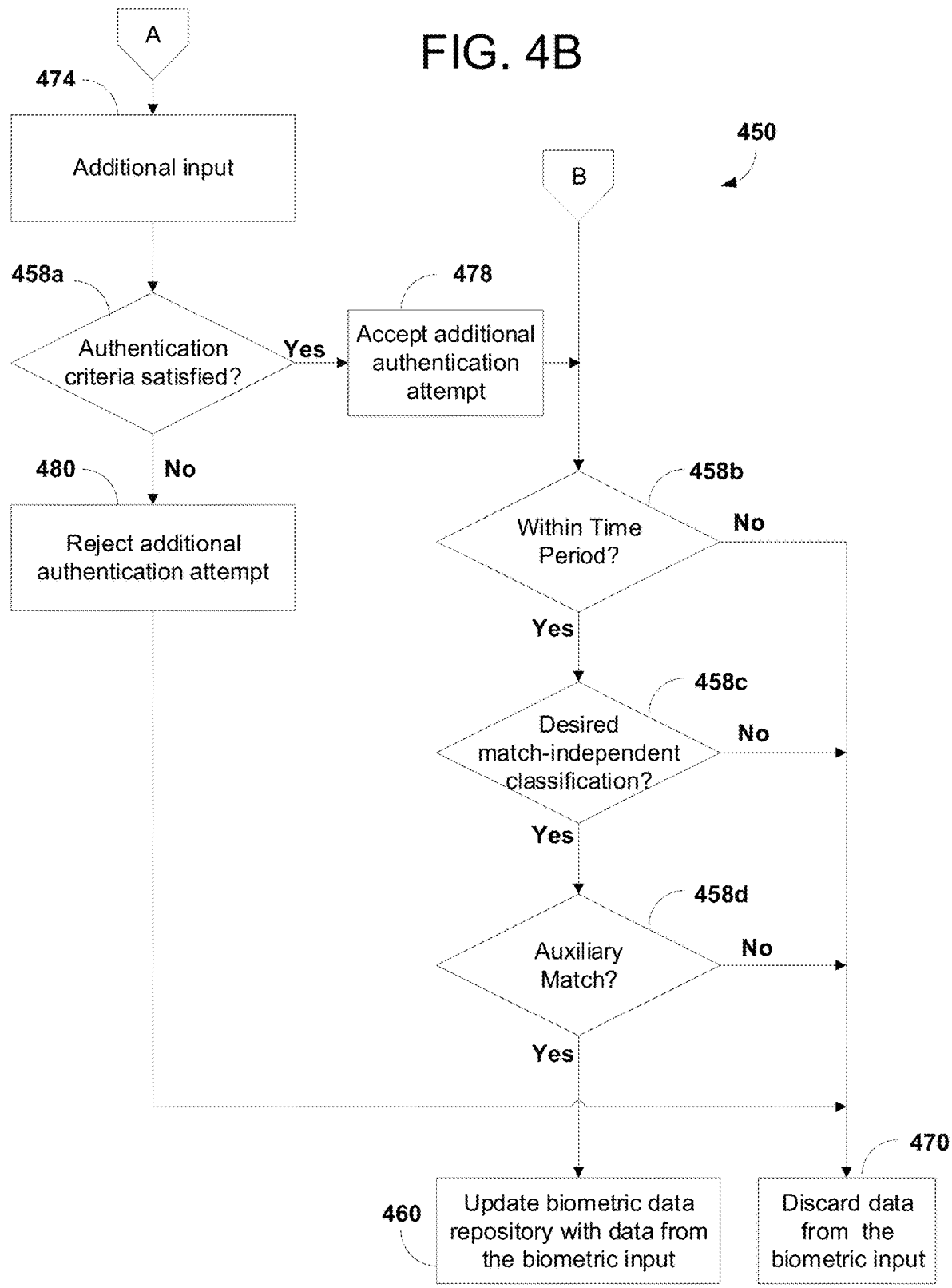

Referring now to FIGS. 4A-4B, a method 450 of updating biometric data based on an auxiliary match determination is disclosed. Some embodiments of the method 450 can be configured in accordance with other appropriate embodiments of methods disclosed herein. Further, like elements are indicated with like reference numerals where appropriate, and more detailed explanation of elements that may be shared in common other disclosed embodiments of methods are omitted for simplicity, where appropriate.

The method 450 involves updating biometric data with data from a biometric input that fails a verification match determination (e.g., feature data extracted from the biometric input and/or the biometric input itself). In the method 450 of FIGS. 4A-4B, a plurality of update criteria 458a-d may be used to validate the failed authentication to determine the biometric input that failed to achieve authentication should still be used to update an enrollment data set. Although a plurality of update criteria 458a-d are shown in FIGS. 4A-4B, any combination of the update criteria shown in FIGS. 4A-4B may be used. Further, it will be understood that other suitable update criteria not illustrated may optionally also be used.

Additionally, in the method 450 each update criteria determination, taken individually or collectively, may be employed as a condition precedent to updating the biometric data at step 460. In particular, in the illustrated embodiment shown in method 450, only in response to positive satisfaction of each of the update conditions 458a-d is the biometric data updated at step 460. Further, as shown, in response to failure of any one of the update conditions 458a-d, the biometric data is not updated at 460 or the data derived from the failed biometric input is discarded at step 470. However, it will be appreciated that in alternate embodiments, the determinations at steps 458a-d can more generally form a basis of the update of biometric data at step 460 using more complex logic or decision making. For example, in some embodiments the update at step 460 may be performed when a weighted or unweighted combination of the various update criteria 458a-d are satisfied. Yet another example would be performing the update at step 460 when only one or more of the update criteria 458a-d are satisfied.

Referring now to FIG. 4A, at step 452 a biometric input is obtained. At step 454, a verification match determination is made on the biometric input based on comparing the biometric input to enrollment data stored in the biometric data repository. The verification match determination is used as an authentication criterion to accept or reject an authentication attempt based on the biometric input passing or failing the verification match determination. When the biometric input passes the verification match determination, the authentication attempt is accepted at step 456. In connection with accepting the authentication attempt, access is granted to an operation of an electronic device at step 464. By way of example, granting access to the operation at step 464 may include unlocking a mobile device or performing a financial transaction in response to accepting the authentication attempt at step 456. Additionally or alternatively, an acceptance message (or indicator) may be output with an output device (e.g., display, speaker, haptic actuator, etc.) in connection with or in response to accepting the authentication attempt at step 456. When the biometric input fails the verification match determination at step 454, the authentication attempt is rejected at step 462. In connection with rejecting the authentication attempt at step 462, access is denied to an operation of an electronic device at step 468. By way of example, denying access to the operation at step 468 may include maintaining a locked state of a mobile device or denying a financial transaction in response to rejecting the authentication attempt at step 462. Additionally or alternatively, a rejection message (or indicator) may be output with an output device (e.g., display, speaker, haptic actuator, etc.) in connection with or in response to rejecting the authentication attempt at step 462.

Also in connection with the failing verification match determination at step 454, data from the failed biometric input is temporarily stored in a memory at step 466. Referring to FIG. 4B, when one or more of the plurality of update criteria 458a-d are determined not to be satisfied, the data derived from the failed biometric input is discarded at step 470. When the plurality of update criteria 458a-d are determined to be satisfied, a biometric data repository is updated with data from the failed biometric input at step 460. The data from the failed biometric input may be stored in the biometric data repository for future match attempts (e.g., for comparison to future new biometric inputs). By way of example, in an embodiment where the biometric input from step 452 is a biometric image, the data stored at step 460 may be a biometric template determined from the image that includes a feature set extracted from the image, a numerical representation of the image, and/or the full image itself.

The update criteria at steps 458a-d include an authentication criterion at step 458a based on an additional authentication determination on an additional input, a timing criterion at step 458b based on a time passed since the rejected authentication, a match-independent criterion at step 458c based on a match-independent classification of the failing biometric input, and an auxiliary match criterion at step 458d based on an auxiliary match determination on the failing biometric input. As further described below, the update criteria 458a-d may increase confidence that data from the failing biometric input can be added to the template, and decrease the likelihood of increasing false acceptance rate (FAR) due to improperly adding false users or user data to the enrollment data set.

Referring to FIG. 4B, at step 474 an additional input is obtained to facilitate an additional authentication determination at step 458*a* in connection with an additional authentication attempt. The additional input at step 474 may be a same biometric modality (or mode) or a different authentication modality (or mode) than the biometric input obtained at step 452. The additional input may be a non-biometric authentication modality. For example, in one embodiment, the biometric input may correspond to a fingerprint biometric modality, and the additional input may correspond to a face biometric modality, an ocular biometric modality, or a voice biometric modality. In another embodiment, the biometric input may correspond to a biometric modality (e.g., fingerprint, face, ocular, voice, hand print, etc.), and the additional input may correspond to a passcode modality (e.g., a password, PIN-code, or user-defined gesture). In some embodiments, each of the separate inputs (e.g., the biometric input at step 452 and the additional input at step 474) may be associated with or obtained from a separate scan of the biometric sensor, a separate input action with a target biometric by a user, or a combination thereof.

In one embodiment, the additional input corresponds to a same biometric modality and is obtained from the same biometric sensor as the biometric input from step 452, and a sensing parameter of the same biometric sensor is modified before obtaining the additional input. By way of example, an integration time or gain settings of an optical sensor may be adjusted to improve detection relative to the biometric input from step 452. In one embodiment, the biometric sensor is configured to repeatedly scan or capture the biometric and match each of the scans (or captures) until one of them successfully matches. In this embodiment, the additional input from step 474 may correspond to any one or more of the repeated scans. In another embodiment, the biometric sensor is configured to capture multiple scans and combine two or more of those scans to obtain the additional input at step 474. For example, an image in the biometric input from step 452 may be averaged together with one or more images from one or more subsequent scans with the biometric sensor, or two or more subsequent scans with the biometric sensor may be averaged together to provide the additional input at step 474. In one embodiment, this may improve a signal to noise ratio (SNR) for the additional input from step 474 relative to the biometric input from step 452.

In the illustrated method 450, the additional input at 474 is obtained after or in connection with outputting a prompt to a user at step 476, but in alternate embodiments, the prompt at step 476 may be omitted. The prompt may include a request for another mode of input (e.g., another biometric or a passcode). Additionally or alternatively, the prompt may include user feedback to perform an action with the detected biometric from step 452. For example, the user feedback can include a prompt to increase pressure with a biometric object or increase pressure with a fingerprint against an input surface. Additionally or alternatively, it can include a prompt to leave a biometric input place or leave a fingerprint in contact with an input surface. In the case of an optical fingerprint sensor, increasing pressure or maintaining contact over a longer time can improve a quality of contact between an input surface and a fingerprint and thereby improve the quality of a subsequent detection of the fingerprint. In another embodiment, the prompt may include a request for a user to touch a nose with their fingerprint, which in the case of a fingerprint sensor may improve a moisture condition of the fingerprint. More generally, the prompt may include user feedback or a request.

At step 458*a*, the method 450 determines whether one or more additional authentication criteria are satisfied based on the additional input from step 474. The authentication criteria at step 458*a* may be satisfied based on biometric and/or non-biometric authentication as described above. For example, the authentication criteria at step 458*a* may be satisfied when the additional input is determined to match an enrolled biometric or when the additional input matches a stored passcode. When the authentication criteria at step 458*a* are satisfied, the additional authentication attempt is accepted at step 478. When the authentication criteria are not satisfied, the additional authentication attempt is rejected at step 480. Further, the data derived from the failing biometric input may be discarded at step 470 in response to the rejection of the additional authentication attempt at step 480.

At steps 458*b-d*, the method 450 determines whether a plurality of additional update criteria are satisfied. In FIG. 4B, the update criteria 458*b-d* are shown as being performed serially, and further, the authentication determination at step 458*a* is shown as being performed in parallel to the update criteria 458*b-d*. However, in various embodiments of the method 450, any two or more of the update determinations at steps 458*a-d* may be performed in parallel and/or serially to each other. At step 458*b*, the method 450 determines whether a time period has passed since the authentication attempt, or more particularly the verification attempt from step 454, based on the biometric input from step 452 (e.g., time period T=2 seconds, 10 seconds, or another appropriate time period). In some embodiments, the time period is determined by initiating a counter in response to the biometric input at step 452, the verification determination at step 454, or another suitable proxy for the authentication attempt associated with the biometric input from step 452. When the time period is determined at step 458*b* to pass before the additional authentication attempt, data from the biometric input is discarded at step 470. When the additional authentication attempt is determined at step 458*b* to occur within the time period, data from the biometric data repository is updated at step 460 to include data from the failed biometric input. Although a time period criterion is shown in FIG. 4B, in some embodiments the method 450 may additionally or alternatively determine whether the additional authentication attempt from step 458*a* is directly subsequent to the verification authentication attempt from step 454. The additional authentication attempt may be determined to be directly subsequent to the verification attempt when there are no intervening authentication attempts between the additional authentication attempt and the verification authentication attempt.

At step 458*c*, the method 450 determines a match-independent classification of the biometric input. The match-independent classification may include one or more determinations on an intrinsic characteristic of the biometric input from step 474 without regard to a comparison to enrolled biometric data. In some embodiments, the match-independent classification at step 485*c* includes a quality determination, a sensor coverage determination, a liveness determination, and/or a changed condition determination.

The quality determination may be based on any appropriate quality metric or image quality analysis (e.g., based on contrast metric, extracted features, etc.). The sensor coverage determination may be based on a determination of whether a fingerprint sensor or other biometric sensor is sufficiently covered by a fingerprint or another biometric (e.g., based on an analysis of an image from the biometric input and/or by segmenting the image into a fingerprint pattern and non-fingerprint pattern region).

The biometric input may pass the sensor coverage determination when it is determined to sufficiently cover the sensor and fail the sensor coverage determination when it is determined to have insufficient coverage over the sensor. By way of example, the sensor coverage determination may be used to forgo a template update in a case of a partial touch that contains insufficient biometric information.

The liveness determination may involve a determination on whether the biometric input is obtained from a real live biometric, and not a spoof or replica. The biometric input may pass the liveness determination when it is determined to be from a live biometric input, and fail the liveness determination when it is determined to be from a spoof (or not from a live biometric input). By way of example, the liveness determination may be based on any appropriate liveness metric or anti-spoofing analysis (e.g., based on image intensities, statistics such as average greyscale values, etc.).

The changed condition determination may pass when the biometric input is determined to correspond to a desired changed condition for inclusion in the enrollment data set, and fail when the biometric input is determined to not correspond to the desired changed condition. By way of example, in the case of a fingerprint exemplified in FIG. 2, the changed condition determination may pass when the biometric input is determined to correspond to a washed finger but not a wet finger or typical (unwashed) finger. By way of example, any of the match-independent classifications may be based on thresholding a score computation, a neural network based on extracted features from an image, a deep learning network, a nonlinear scoring function, etc.

It should be noted that although the classifications at step 458c are shown as match-independent determinations, in some alternate embodiments, one of more of these classifications may be made in a match-dependent manner based on a comparison to stored or enrolled biometric data. For example, the quality or liveness determinations may be made based in whole or in part on a comparison, or statistics or features derived from a comparison, which may be separate from an auxiliary match determination or combined into the auxiliary match determination below. By way of example, a neural net trained on all of the different categories of desired images and receiving all the appropriate features, statistics, or metrics as inputs can be used to make multiple determinations simultaneously.

At step 458d, an auxiliary match determination is made based on the biometric input that fails the verification match determination from step 454. By way of example, the auxiliary match determination may be based on different thresholds, parameters, alignment, scoring, or features as further described herein. When the biometric input passes the auxiliary match determination, the biometric data repository is updated at step 460, and when the biometric input fails the auxiliary match determination, data derived from the biometric input is discarded at step 470.

Template updating can involve a modification of the enrollment data set that could potentially allow unrestricted future access to an imposter if the template is inadvertently updated with the imposter's data. Moreover, unlike making a single false rejection, updating the template with incorrect data can cause an increase in FRR or otherwise negatively affect future performance over many instances of authentication. Accordingly, in some embodiments, template updating may be associated with an overall higher security requirement than common access control functions such as a device unlock. Such a higher security level may be enforced using an auxiliary matching criterion that is by itself lower security than a primary matching criterion used for making an authentication accept/reject determination, but is coupled with an additional strong authentication (such as passcode authentication or a different biometric modality) to collectively provide an overall higher security level. Alternatively, an auxiliary matching criterion may be used that itself provides a higher security level (without a need for another authentication), but is more computationally expensive than the matching criterion used for authentication accept/reject determinations.

Figure 5:
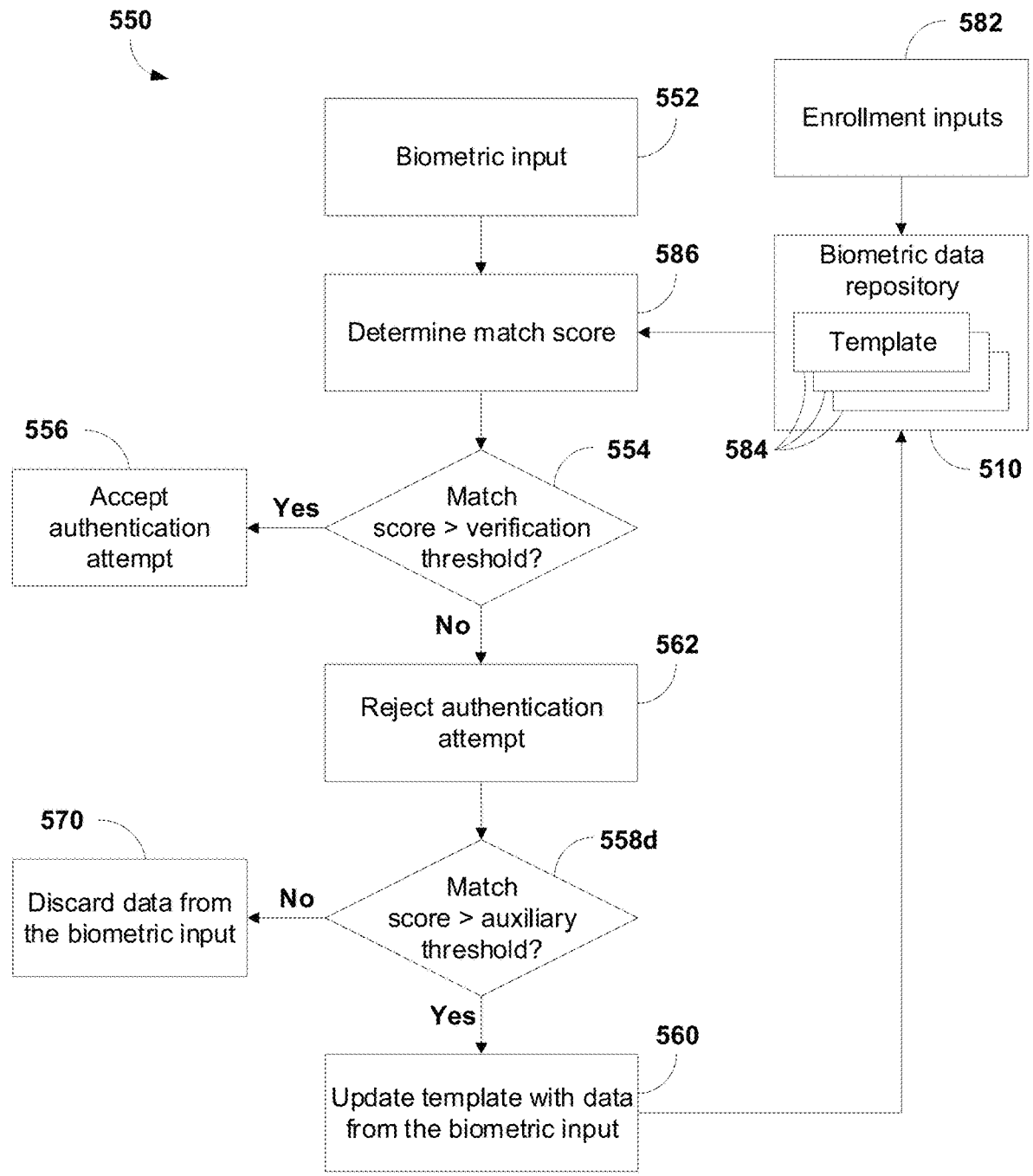
FIG. 5 is a flowchart depicting an embodiment of a method of updating biometric data based on an auxiliary match determination.

Referring now to FIG. 5, a method 550 of updating biometric data based on an auxiliary match determination is disclosed. Some embodiments of the method 550 can be configured in accordance with other appropriate embodiments of methods disclosed herein. Further, like elements are indicated with like reference numerals where appropriate, and more detailed explanation of elements that may be shared in common other disclosed embodiments of methods are omitted for simplicity, where appropriate.

In the embodiment of FIG. 5, an auxiliary match determination forms a basis of updating a biometric data repository 510 in connection with a failed verification match attempt. The auxiliary match determination shown in FIG. 5 is based on a relaxed threshold, and further, the auxiliary match determination may be utilized to identify a template in connection with a verification failure. The relaxed threshold may correspond to a lower degree of agreement between the biometric input and the stored biometric data. When used alone, such a relaxed threshold may ordinarily indicate a lower degree of confidence in the match for the failed biometric input. However, when a relaxed threshold is used in combination with an additional authentication (e.g., authentication based on the additional input from step 474 in FIG. 4B), the relaxed threshold together with the additional authentication may provide an overall high confidence that allows the template to be updated without compromising security or performance of the biometric recognition system.

Referring again to FIG. 5, at step 582 a plurality of enrollment biometric inputs are detected, and data from the plurality of enrollment biometric inputs are stored in a plurality of templates 584 contained in the biometric data repository 510. By way of example, in an embodiment where the enrollment inputs from step 582 are a biometric images, data in the plurality of templates 584 may include feature sets extracted from the images, numerical representations of the images, and/or the full images themselves. In one embodiment, the plurality of enrollment inputs are detected during an active enrollment process prior to detection of the new biometric input at step 552. Three templates are shown in FIG. 5 as an example, but in alternate embodiments, any appropriate number of templates may be employed. Each of the plurality of templates 584 may be associated with a respective identifier (e.g., a template ID) to facilitate an identification determination based on which of the plurality of templates 584 is determined to match a new biometric input. In general, the plurality of templates can correspond to any appropriate plurality of sets of enrolled biometric data for which identification or separate template storage may be desired. For example, the plurality of templates may be derived from the same or different users, the same or different biometric modalities, the same or different parts of biometrics, and/or the like. The identification determination may involve identification of a particular enrolled user out of a plurality of enrolled users, an identification of a particular finger out of a plurality of enrolled fingers (from the same or different users), or more generally, identification of a particular template of the plurality of enrolled templates 584. In an example embodiment employing fingerprint recognition, the plurality of templates 584 may respectively correspond to a plurality of different enrolled fingers, with each of the templates containing data derived from one or several images of the corresponding enrolled finger.

Referring again to FIG. 5, a biometric input is obtained at step 552. At step 586, a match score is determined based on a comparison of the biometric input to enrollment data stored in the biometric data repository 510. At step 554, a verification match determination is made based on comparing the match score to a verification threshold. When the match score satisfies the verification threshold, the authentication attempt is accepted at step 556. When the match score fails to satisfy the verification threshold, the authentication attempt is rejected at step 562. When the authentication attempt is rejected, an auxiliary match determination is made as to whether the match score from step 586 satisfies an auxiliary threshold at step 558*d*. When the match score satisfies the auxiliary threshold (and other criteria such as the additional authentication from step 458*a* shown in FIG. 4B are satisfied), the biometric data repository 510 is updated at step 560. More particularly, the biometric data repository 510 can be updated by storing data from the biometric input from that failed the verification match determination. When the match score fails to satisfy the auxiliary match threshold, the biometric data repository 510 is not updated with the biometric input from step 552, and data from the failing biometric input is discarded at step 570. In the method 550 shown in FIG. 5, the auxiliary match threshold is a relaxed threshold relative to the verification threshold from step 554. In particular, the auxiliary match threshold at step 558*d* may correspond to less agreement between the biometric input and the enrollment data set than the verification threshold. Depending on the scoring metric(s) used, the relaxed threshold may be numerically lower or higher. For example, a numerically lower score may indicate a higher degree of agreement when a difference metric is used, while a numerically higher score may indicate a higher degree of agreement when a similarity metric is used. When used in connection with an additional authentication (such as step 458*a* in FIG. 4), the auxiliary match determination based on the relaxed threshold may provide an additional measure of confidence that the previous biometric input was obtained from the true enrolled user, and not an imposter or another user that interacted with the biometric sensor prior to the subsequent accepted authentication at step 458*a*. For example, in some instances a true enrolled user may wish to provide temporary access to another, non-enrolled user. If the non-enrolled user intentionally or unintentionally interacted with the biometric sensor prior to the accepted additional authentication attempt, data from the non-enrolled user may be inadvertently added to the template in embodiments where the auxiliary match determination is not employed.

In some embodiments, a template in the set of templates 584 may be identified based on the template that produces the best match score that fails the verification threshold, but satisfies the auxiliary threshold. The auxiliary identification determination may be used to identify an appropriate template to update in the plurality of templates 584 and/or the identification determination may be used for any other appropriate purpose. Accordingly, in some auxiliary identification embodiments, determining the match score at step 586 includes determining a one or more match scores for the plurality of templates 584 stored in the biometric data repository, and the verification determination at step 554 may be further based on the one or more match scores. When one of the match scores satisfies the verification threshold, the match authentication attempt may be accepted at step 556. When the match scores fail to satisfy the verification threshold, the authentication attempt is rejected. At step 558*d*, the match scores that failed the verification threshold are checked against the auxiliary threshold, and when at least one match score satisfies the auxiliary threshold (and other criteria such as the additional authentication from step 458*a* shown in FIG. 4B are satisfied), the biometric data repository 510 is updated. When more than one match score is determined and at least one of the match scores satisfies the auxiliary threshold, the method 550 may also determine a best match score in the plurality of match scores failing the verification threshold, and identify the template that produces the best match score. The biometric data repository 510 may be updated at step 560 by storing data from the failing biometric input into the identified template. The match score at step 586 may be determined using any appropriate match scoring function (e.g., neural networks based on extracted features, deep learning nets, linear or nonlinear scoring functions, etc.).

In some embodiments, biometrics are susceptible to changes that are so significant that different matching parameters, alignment processes, and/or feature sets are appropriate for the auxiliary match determination. For example, local features (e.g., points, local patches, etc.) and/or feature-based image alignment may provide high match confidence at the verification stage for most cases, while global features (e.g., intensity images, gradient images, binary images, global statistics, etc.) and/or intensity-based image alignment (e.g., correlation alignment, coarse-to-fine pyramid based alignment, minimization/maximization of a distance function, etc.) may provide higher accuracy validation at the auxiliary matching stage in cases of changed biometrics and/or where a lower security level might be acceptable for the auxiliary match determination (due to the other additional authentication).

Referring again to the images of fingerprints shown in FIG. 2, differences in appearance between image IMG1 and image IMG2 of the same finger but under different conditions are different enough such that different alignment processes and/or feature sets may be more appropriate for each condition. As shown in FIG. 2, image IMG1 of a finger under typical skin condition shows well defined ridges and valleys and highly oriented texture in contrast to those shown in image IMG2 of a washed finger. Accordingly, when comparing typical fingerprint images such as that shown in the image IMG1, feature points, such as minutia (e.g., bifurcations and ridge endings) and interest points (e.g., corresponding to blobs, SIFT points, etc.), can provide strong performance in the alignment and/or scoring phase due to their relatively high reliability, repeatability, and discriminative power. However, such feature points may not be as repeatable or there may be errors in the point feature detection or feature-based alignment (or registration) process in the washed finger image IMG2. Accordingly, direct comparisons of intensities for image alignment and/or match scoring may provide better or more robust matching performance for certain changed images or when attempting to match between changed images.

Figure 6:
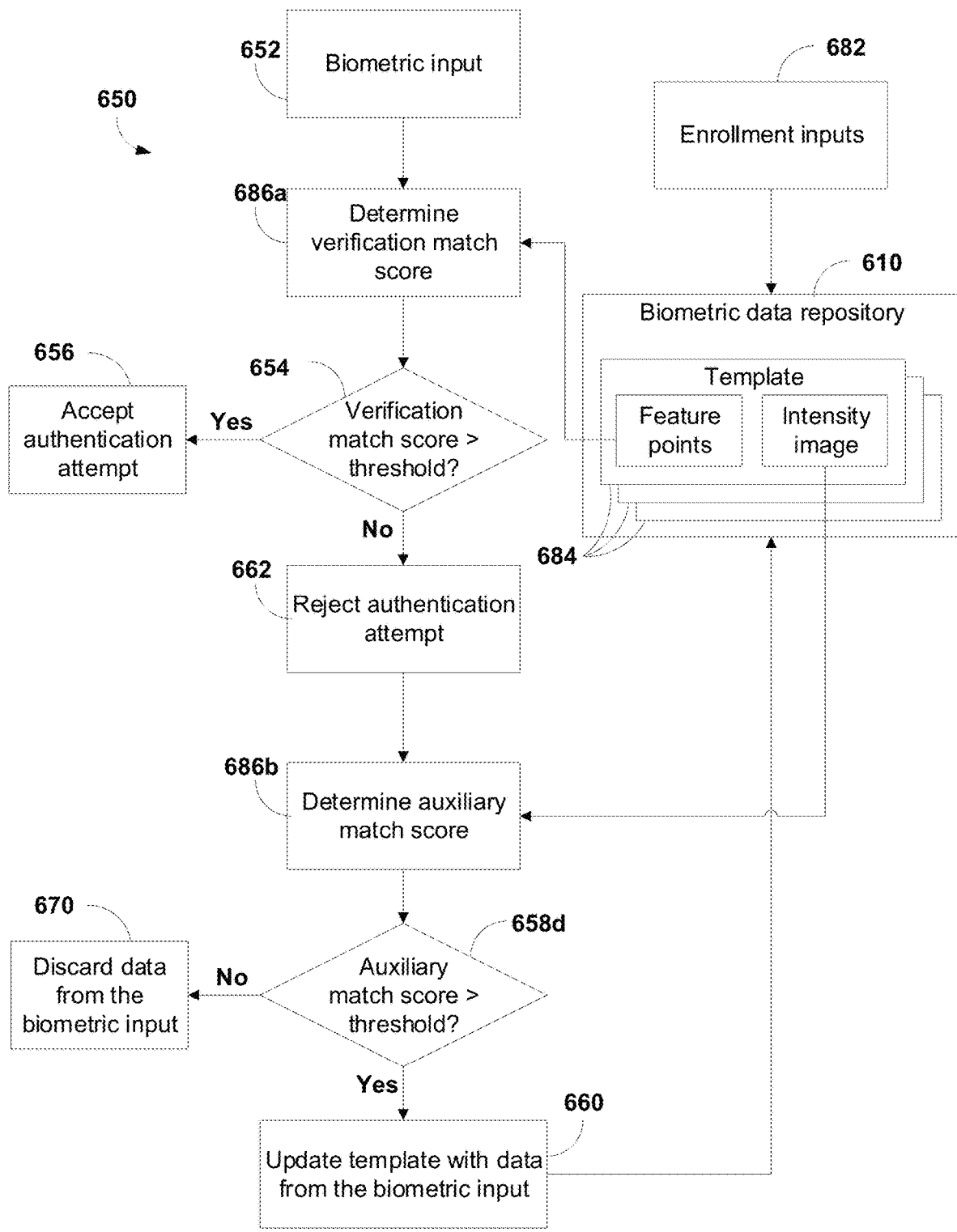
FIG. 6 is a flowchart depicting an embodiment of a method of updating biometric data based on an auxiliary match determination.
Figure 7A:
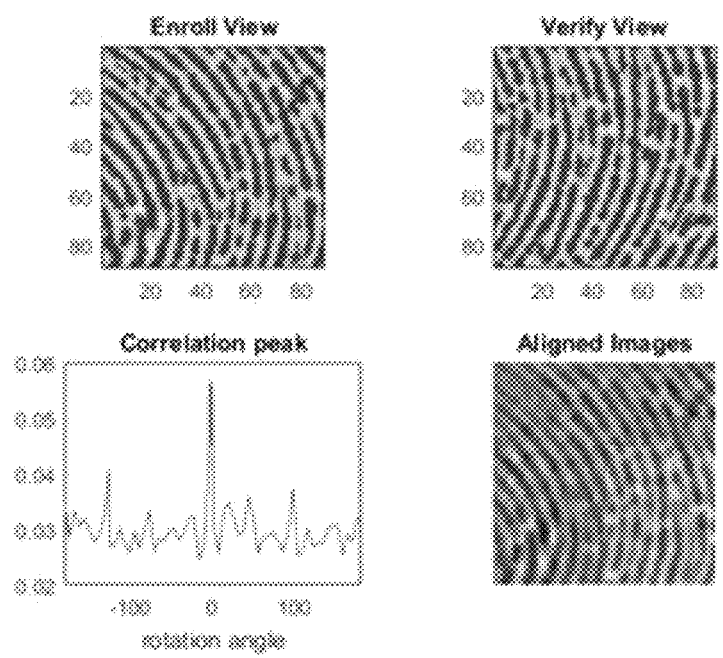
FIGS. 7A-7B are a set of images and charts depicting an embodiment of a method of aligning and comparing biometric images.
Figure 7B:
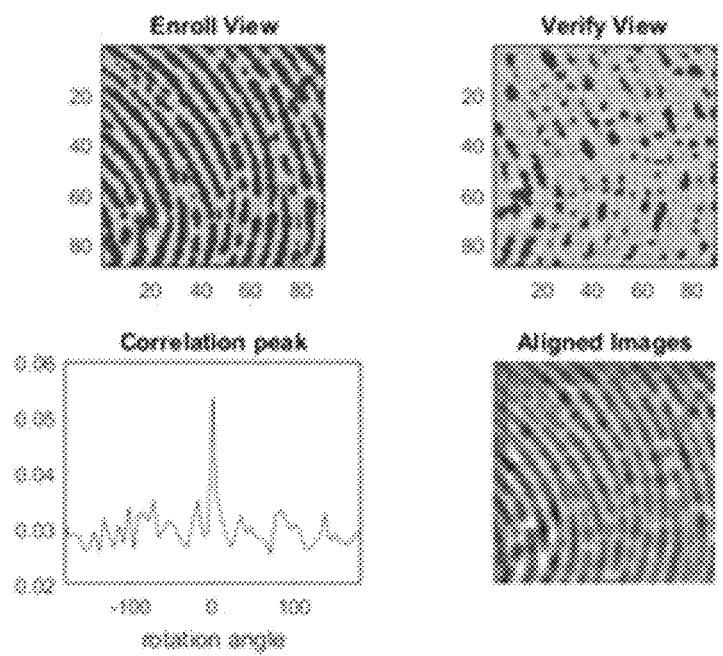

Referring to FIG. 6, a method 650 is disclosed that involves a verification match determination based in whole or in part on feature points and an auxiliary match determination based in whole or in part on intensity images (or greyscale images). FIG. 7A-7B depict an example of comparing unchanged biometric images (enroll view and verify view) using an intensity-based correlation alignment (FIG. 7A), and comparing changed biometric images (enroll view and verify view) using an intensity-based correlation alignment (FIG. 7B). In this example, the alignment includes determination of a rotation, but in various embodiments, the alignment may involve determination of any appropriate transformation (e.g., a rigid or affine transformation involving a rotation, a translation, a scaling, etc.). Further, in the example shown in FIG. 7A-7B, the strength of the correlation peak may be used as a score or a scoring metric for making an auxiliary match determination, but additionally or alternatively, other metrics such as a Euclidean distance between ridge pixels may be used.

Some embodiments of the method 650 can be configured in accordance with other appropriate embodiments of methods disclosed herein. Further, like elements are indicated with like reference numerals where appropriate, and more detailed explanation of elements that may be shared in common other disclosed embodiments of methods are omitted for simplicity, where appropriate.

Referring again to FIG. 6, at step 682 a plurality of enrollment biometric inputs are obtained, and data from the plurality of enrollment biometric inputs are stored in a plurality of templates 684 contained in the biometric data repository 610. The enrollment inputs may be detected based on image sensing with a biometric sensor. Each of the plurality of templates 684 may be associated with a respective identifier (e.g., a template ID) to facilitate an identification determination based on which of the plurality of templates is determined to match new biometric inputs. Each of the enrollment inputs are stored in one or more representations that allow the multiple desired features and/or image representations to be derived from the same template. By way of example, this may involve storing the desired feature sets and image representations themselves, or storing a sufficient set of enrollment data that allows these to be determined at match time. For example, in one embodiment both the feature points themselves and the intensity images may be stored in each of the plurality of templates 684. In another embodiment, the intensity image itself is stored in each of the plurality of templates 684, and the feature points are determined (or extracted from) the enrolled intensity image at match time.

At step 652, a biometric input is obtained. At step 686a, a match score is determined based on a comparison of the biometric input to enrollment data stored in the biometric data repository 610. More specifically, in the method 650 shown in FIG. 6, the verification match score is determined based in whole or in part on comparing feature points from the biometric data repository 610 to feature points from the biometric input. At step 654, a verification match determination is made based on comparing the verification match score to a threshold. When the verification match score satisfies the threshold, the authentication attempt is accepted at step 656. When the verification match score fails to satisfy the threshold, the authentication attempt is rejected at step 662.

When the authentication attempt is rejected, an auxiliary match score is determined at step 686b based on a comparison of the biometric input to enrollment data stored in the biometric data repository 610. More specifically, the auxiliary match score may be determined based on, in whole or in part, a direct comparison of intensities from an intensity image corresponding to the biometric input and intensities from an intensity image from the biometric data repository 610.

Referring again to FIG. 6, at step 658d, an auxiliary match determination is made as to whether the auxiliary match score from step 686b satisfies a threshold. When the auxiliary match score satisfies the auxiliary threshold, the biometric data repository 610 is updated at step 660. More particularly, the biometric data repository 610 is updated by storing data derived from the biometric input from step 652 that failed the verification match determination. By way of example, the data stored may be image intensities and/or feature points. When the auxiliary match score fails to satisfy the auxiliary match threshold, the biometric data repository 610 is not updated with the biometric input from step 652, and data derived from the failing biometric input is discarded at step 670.

In some embodiments, a template in the set of templates 684 may be identified based on the template that produces the best auxiliary match score separate from the failing verification match scores. The auxiliary identification determination may be used to identify a correct template to update in the set of templates and/or the identification determination may be used for any other appropriate purpose.

In accordance with an auxiliary identification embodiment, determining the auxiliary match score at step 658b includes determining a plurality of auxiliary match scores for the plurality of respective templates 684 stored in the biometric data repository. The auxiliary match determination at step 658d is based on each of the plurality of auxiliary match scores. When one of the plurality of auxiliary match scores satisfies the auxiliary threshold, the template producing the best auxiliary match score may be updated at step 660. When each of the plurality of auxiliary match scores fail to satisfy the auxiliary threshold, the data derived from the biometric input 652 is discarded at step 670.

FIGS. 6 and 7A-7B provide particular examples with reference to feature points and intensity images for the verification match and auxiliary match. However, in various embodiments of the method 650, the verification match determination may generally rely on any appropriate local features (e.g., points, local patches, etc.) and/or feature-based image alignment. Furthermore, the auxiliary match determination may generally rely on any appropriate global representation of the inputs (e.g., intensity images, gradient images, binary images, global statistics, etc.) and/or intensity-based image alignment (e.g., correlation alignment, coarse-to-fine pyramid based alignment, minimization/maximization of a distance function, etc.).

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, although variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for updating biometric data, the device comprising:
    a biometric sensor; and
    a processor configured to:
        reject an authentication attempt based on a biometric input from the biometric sensor failing a plurality of first match determinations for a plurality of templates stored in a biometric data repository, wherein the plurality of first match determinations are made based on a plurality of match scores failing to satisfy a first match threshold;
        identify a first template of the plurality of templates by determining a best match score in the plurality of match scores that fail to satisfy the first match threshold;
        accept an additional authentication attempt based on an additional biometric input from the biometric sensor passing an auxiliary match determination; and
        update the biometric data repository based on the biometric input.

2. The device of claim 1, wherein the processor is further configured to:
    identify a second template in the plurality of templates based on the auxiliary match determination by determining a best auxiliary match score in a plurality of auxiliary match scores.

3. The device of claim 2, wherein the first template is the same as the second template.

4. The device of claim 2, wherein when the processor updates the biometric data repository with the data from the biometric input, the processor updates one of the first template or the second template.

5. The device of claim 1, wherein the processor is further configured to:
    determine a match score of the plurality of match scores based on comparing the biometric input to enrollment data stored in the biometric data repository;
    make a match determination of the plurality of first match determinations based on the match score failing to satisfy the first match threshold; and
    make the auxiliary match determination based on the match score satisfying an auxiliary match threshold, wherein the auxiliary match threshold is relaxed relative to the first match threshold.

6. The device of claim 1, wherein the processor is further configured to:
    determine a match score of the plurality of match scores based on comparing the biometric input to enrollment data stored in the biometric data repository;
    determine an auxiliary match score based on comparing the auxiliary biometric input to the enrollment data stored in the biometric data repository;
    make a match determination of the plurality of first match determinations based on the match score failing to satisfy the first match threshold; and
    make the auxiliary match determination based on the auxiliary match score satisfying the threshold.

7. The device of claim 1, wherein the processor updates the biometric data repository further based on a determination that the additional authentication attempt occurs within a specified time period of the rejected authentication attempt.

8. The device of claim 1, wherein after rejecting the first authentication attempt, the processor is configured to repeatedly scan the biometric sensor until a passing match determination is made.

9. The device of claim 1, wherein the biometric input and the additional biometric input correspond to different modalities.

10. The device of claim 9, wherein the additional biometric input corresponds to a different biometric modality than the biometric input.

11. The device of claim 9, wherein the additional biometric input corresponds to a non-biometric modality.

12. The device of claim 1, wherein the update the biometric data repository based on the biometric input comprises storing the biometric input that fails the plurality of first match determinations in the biometric data repository.

13. A method of updating biometric data, the method comprising:
    rejecting an authentication attempt based on a biometric input from a biometric sensor failing a plurality of first match determinations for a plurality of templates stored in a biometric data repository, wherein the plurality of first match determinations are made based on a plurality of match scores failing to satisfy a first match threshold;
    identifying a first template of the plurality of templates by determining a best match score in the plurality of match scores that fail to satisfy the first match threshold;
    accepting an additional authentication attempt based on an additional biometric input from the biometric sensor passing an auxiliary match determination; and
    updating the biometric data repository based on the biometric input.

14. The method of claim 13, further comprising:
    identify a second template in the plurality of templates based on the auxiliary match determination by determining a best auxiliary match score in a plurality of auxiliary match scores.

15. The method of claim 14, wherein the first template is the same as the second template.

16. The method of claim 13, wherein the updating the biometric data repository based on the biometric input comprises storing the biometric input that fails the plurality of first match determinations in the biometric data repository.

17. A non-transitory computer readable storage medium storing instructions that, when executed by a processor, configure the processor to:

reject an authentication attempt based on a biometric input from the biometric sensor failing a plurality of first match determinations for a plurality of templates stored in a biometric data repository, wherein the plurality of first match determinations are made based on a plurality of match scores failing to satisfy a first match threshold;

identify a first template of the plurality of templates by determining a best match score in the plurality of match scores that fail to satisfy the first match threshold;

accept an additional authentication attempt based on an additional biometric input from the biometric sensor passing an auxiliary match determination; and update the biometric data repository based on the biometric input.

18. The non-transitory computer readable storage medium of claim 17, wherein the processor is further configured to:

identify a second template in the plurality of templates based on the auxiliary match determination by determining a best auxiliary match score in a plurality of auxiliary match scores.

19. The non-transitory computer readable storage medium of claim 18, wherein the first template is the same as the second template.

20. The non-transitory computer readable storage medium of claim 17, wherein the update the biometric data repository based on the biometric input comprises storing the biometric input that fails the plurality of first match determinations in the biometric data repository.

* * * * *